(No Model.)

H. L. COOKE.
PLANTING ATTACHMENT.

No. 552,515. Patented Jan. 7, 1896.

Witnesses:
C. F. Kilgore
E. F. Elmore

Inventor.
Hiram L. Cooke
By his Attorney,
Jas. F. Williamson

UNITED STATES PATENT OFFICE.

HIRAM L. COOKE, OF BRAMPTON, NORTH DAKOTA.

PLANTING ATTACHMENT.

SPECIFICATION forming part of Letters Patent No. 552,515, dated January 7, 1896.

Application filed April 4, 1895. Serial No. 544,367. (No model.)

*To all whom it may concern:*

Be it known that I, HIRAM L. COOKE, a citizen of the United States, residing at Brampton township, in the county of Sargent and State of North Dakota, have invented certain new and useful Improvements in Planting Attachments; and I do hereby declare the following to be a full, clear, and exact description of the invention, such as will enable others skilled in the art to which it appertains to make and use the same.

My invention relates to planters, and has for its object to provide a planting attachment, of simple and cheap construction, which is adapted to be detachably secured to a plow, lister, check-rower, or to any one of various other kinds of farming implements or machines, which are capable of being drawn over the ground wherein the planting is to be done. The attachment was especially designed for use as a corn-planter, but is of course also capable of use for planting some other kinds of seeds, such as beans, peas, &c. The especial purpose had in view was to provide a planter which the farmer might readily attach to his plow or any one of the many other tillage-machines which he usually has available on the farm.

To this end the invention consists of the novel features of construction hereinafter described and defined in the claims.

The invention is illustrated in the accompanying drawings, wherein the attachment is shown as applied to a sulky-plow.

Figure 1:
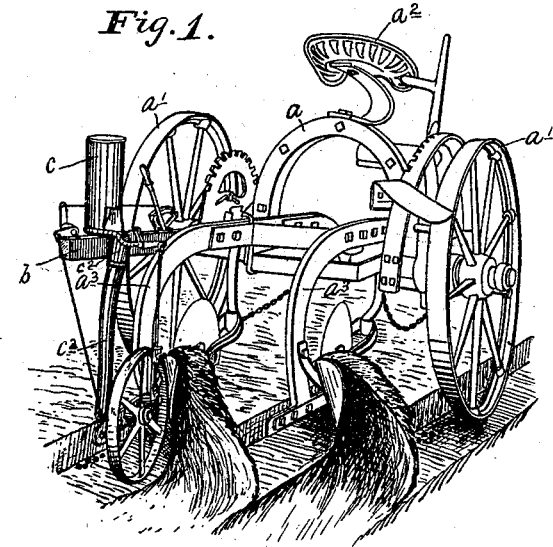
Figure 2:
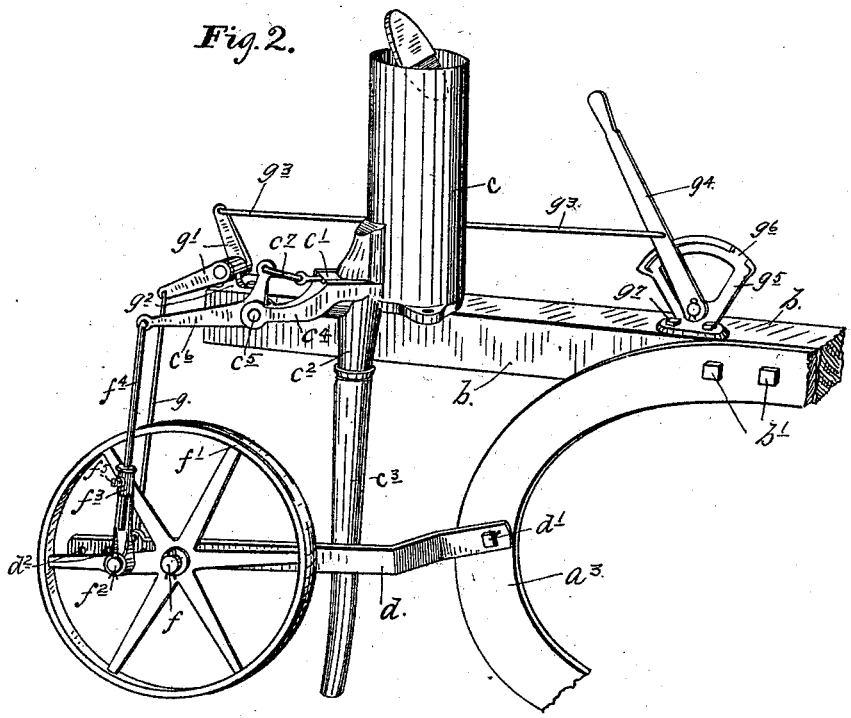

In the said drawings, like letters referring to like parts, Figure 1 is a perspective view of the sulky-plow and attachment in working position, and Fig. 2 is a perspective view of the attachment and a part of the plow with some portions shown in section and others broken away.

The sulky-plow illustrated is of the ordinary well-known standard construction, and for the purposes of this case it will be sufficient to distinguish the main frame $a$, the wheels $a'$, the seat $a^2$, and the plow-beams $a^3$.

Directing attention now to the planting attachment, $b$ is a bed-block or beam, which is adapted to be bolted, as shown at $b'$, to the landside of one of the plow-beams $a^3$ and to project rearward therefrom in position to be approximately horizontal when the plow is in working position. To the rear part of the bed-block or beam $b$ is fixed in any suitable way a seed-receptacle $c$, which is provided with a dropping device of any suitable kind, shown as comprising an operating-slide $c'$, extending to the exterior of the receptacle. The said receptacle $c$ is also provided with a delivery-spout $c^2$ and a flexible seed tube or hose $c^3$, depending therefrom. The bed-casting of the receptacle $c$ is shown as provided with an angular projection $c^4$, to which is pivoted, as shown at $c^5$, a bell-crank lever $c^6$ for rocking motion in the vertical plane. The upper or short arm of the bell-crank lever $c^6$ is pivotally connected to the dropper-slide $c'$, as shown, by a link $c^7$, so that the rocking motion of the bell-crank $c^6$ will reciprocate the slide $c'$ and operate the dropper.

$d$ is an angular drag-bar, which is pivotally and detachably secured, at its forward end, to the plow-beam $a^3$ by the bolt $d'$, or in any other suitable way. In the rear end of the drag-bar $d$ are a series of holes $d^2$, in any one of which may be secured a stud or spindle $f$, on which is mounted a ground-wheel $f'$, adapted to follow in the furrow or seed-bed. The ground-wheel $f'$ is provided with a crank-pin $f^2$, which is connected by a sectional pitman $f^3 f^4$ with the lower or long arm of the bell-crank lever $c^6$, for operating the dropper-slide $c'$ from the ground-wheel $f'$. The pitman-sections $f^3 f^4$ telescope with each other, and may be secured in any desired adjustment, relative to each other, by a jam-screw $f^5$ working through the sleeve-section $f^3$ against the rod-section $f^4$. This telescoping-pitman is desirable for adapting the attachment to machines wherein the seed-receptacle $c$ and the bed-block $b$ will have to stand at different levels in respect to the center of the ground-wheel $f'$.

The rear end of the draw-bar $d$ is connected by a link or rod $g$ with the lower arm of a bell-crank $g'$ pivoted to a bearing $g^2$, fixed to the rear end of the bed-block $b$. The upper arm of the bell-crank lever $g'$ is connected by rod $g^3$ with a hand-lever $g^4$, pivoted to the lock-segment $g^5$ and engageable with notches $g^6$ thereon in either one of its two extreme positions. The lock-segment casting $g^5$ is bolted, or otherwise secured, as shown at $g^7$, to the forward end of the bed-block $b$, in position to bring the lever $g^4$ within reach of the operator or driver on the plow-seat $a^2$. These lever connections afford a means of raising and lowering the rear end of the drag-bar $d$ and with it the ground-wheel $f'$, at will, independently of the plows $a^3$.

Having regard to the operation, the action is probably clear from the drawings and the statements already made. The plow, when in working position, will open the furrow, as shown in Fig. 1, and the ground-wheel $f'$ will follow behind the plow in the bottom of the furrow. The seed-tube $c^3$ will also project into the furrow, directly behind the plow, and to one side of or slightly in advance of the ground-wheel $f'$. With every revolution of the ground-wheel $f'$ the dropper-slide $c'$ will be thrown outward to its limit by means of the pitman connections from the ground-wheel to said slide, and thereby the corn or other material will be delivered from the receptacle into the seed-tube and be directed to its bed at the bottom of the furrow. On reaching the end of the furrow, or at any other point desired to make the turn, or stop the action of the dropper, the operator will lift the drag-bar and ground-wheel into their uppermost position, so as to render the ground-wheel inoperative.

It is obvious that with this device the corn or other material will be dropped at uniform spaces, equivalent in length to the periphery of the ground-wheel $f'$, and by making this wheel of different sizes any desired spacing of the hills of corn in the row may be secured. It must also be obvious that by taking the requisite care on making the turn, so as to start the first hill of the second row directly opposite the last hill of the first row, in the desired transverse line, the corn may be dropped in check-rows or so as to be cultivated in two directions at right angles to each other.

The adjustability of the wheel-spindle $f$ in the drag-bar $d$, taken together with the telescoping pitman $f^3 f^4$, as described, affords a range of adjustment for the relative levels of the seed-receptacle $c$ and the center of the ground-wheel $f'$, which enables the attachment to be applied to a great variety of machines.

With the attachment secured directly to the plow-beam $a^3$, as shown, it is of course obvious that the whole attachment will be adjustable with the plows, under the control of the operator on the seat $a^2$. It will be understood, however, that the seed-receptacle and the drag-bar of the attachment might be secured to the main machine in any other suitable way, according to the circumstances of the particular case. It will also be understood that the details of the construction of my attachment might be changed without departing from the spirit of my invention.

What I claim, and desire to secure by Letters Patent of the United States, is as follows:

1. A planting attachment, comprising a seed receptacle detachably securable to a plow or other machine and provided with a dropper, a drag-bar pivotally and detachably securable at its forward end, to the plow or other machine, a ground wheel mounted on the rear end of said drag-bar and provided with a crank-pin, pitman connections, for operating said dropper from said ground-wheel, and lever connections for raising and lowering said ground wheel, at will, substantially as and for the purpose set forth.

2. In the planting attachment described, the combination with the seed receptacle having a dropper and the ground-wheel having a crank-pin, of a pitman for operating said dropper from said wheel, which pitman is constructed of longitudinally adjustable sections securable at any desired relative adjustment, substantially as and for the purposes set forth.

3. The planting attachment described, comprising the bed-block $b$, the seed receptacle $c$ secured to said bed-block and having a dropper $c'$, a spout $c^2$ and tube $c^3$, the bell-crank lever $c^6$, pivoted to said receptacle and connected to said dropper by the link $c^7$, the drag-bar $d$ with the wheel spindle holes $d^2$, the spindle $f$ securable in any one of said holes, the ground-wheel $f'$ having the crank-pin $f^2$, mounted on said spindle, the sectional telescoping pitman $f^3 f^4 f^5$, and the lever connections $g\ g'\ g^3\ g^4\ g^5$, all arranged and operating substantially as described.

In testimony whereof I affix my signature in presence of two witnesses.

HIRAM L. COOKE.

Witnesses:
JAS. F. WILLIAMSON,
C. F. KILGORE.